United States Patent Office

3,159,536
Patented Dec. 1, 1964

3,159,536
HYDROPHOBIC SILICEOUS INSECTICIDAL
COMPOSITIONS
Ralph Marotta, Olivette, Mo., assignor to Monsanto Company, a corporation of Delaware
No Drawing. Filed Apr. 22, 1960, Ser. No. 23,895
18 Claims. (Cl. 167—42)

The present invention relates to improved insecticide compositions, particularly to improved inert siliceous insecticide compositions and to processes for preparing such compositions. The present invention also relates to methods for killing insects and controlling common insect pests.

It has been proposed heretofore to kill common insect pests by contacting them with dry, amorphous, particulate hydrophilic siliceous materials, namely, synthetic silicas such as fume silica, precipitated silica, and silica aerogels, and naturally occurring siliceous materials such as diatomaceous earths, very fine sand, insoluble metal silicates, and silicate clays. Insects are known to be rapidly killed and/or crippled when contacted with such materials when these materials have been ground to micron-range particle sizes and have thereafter been thoroughly dried. Such materials due to their abundance and low cost have an economic advantage over classical chemical insecticides.

The above-described classes of hydrophilic siliceous materials have been referred to as "inert" insecticides in that they are water-insoluble and are not physiological poisons, that is, they do not kill insects through a poisoning effect and they are neither toxic nor injurious to human beings and warm blooded domestic animals. Although the precise mechanism of lethality is not known, the more effective hydrophilic siliceous materials are characterized in being dry, finely divided and as having a low bulk density, that is, a low unit weight per unit volume of uncompressed material.

When insects are contacted with the above materials they lose weight rapidly, and while it has been postulated that the insect death is due to desiccation, there is no certainty that such desiccation is the cause of death nor is there any apparent or evident reason why inert siliceous materials should cause insects to lose weight or to be desiccated unless the hydrophilic nature of the siliceous particles causes such hydrophilic particles to compete with the water in the body of the insect and to imbibe such water therefrom.

The above-referred to inert siliceous materials have particular utility in controlling insect pest species which have become resistant to classical inorganic or organic poisonous insecticides such as arsenic, sodium fluoride, Chlordane, Lindane and DDT. Moreover, such amorphous siliceous materials, being nontoxic, have the further advantage of not requiring the cumbersome safety handling procedures during manufacture and use, which safety procedures are usually necessary in dealing with insecticides which are physiological poisons. Since insect pests are responsible for agricultural losses and in some instances for the spread of disease, methods of economic insect control have become increasingly important.

The above-referred to classes of hydrophilic siliceous materials are described as insecticidally effective in the Journal of Economic Entomology, pages 190–212, volume 52 (1959), and in the Annals of Applied Biology, pages 143–160, volume 31 (1944). In these publications, siliceous "dusts" and a variety of dusts other than siliceous "dusts" are described as being partially effective as insecticidal materials. However, the dusts which comprise the aforementioned siliceous materials are stated to be more effective inert insecticides, but according to these publications and actual tests, all such hydrophilic siliceous dusts substantially lose their insecticidal effectiveness when exposed to humid atmospheric conditions.

However, although the aforedescribed hydrophilic materials are quite effective when dry, such materials, as stated above, lose an appreciable portion of their ability to kill insects upon exposure to humid atmospheric conditions or when wetted with water. Such "moisturized" siliceous materials are then ineffective as insecticides. Since insect pests are commonly found under conditions of high humidity, the wide-spread utilization of these hydrophilic materials in control of common insect pests has not been practicable. In accordance with the present invention, it has unexpectedly been found possible to generally improve the initial insecticidal activity and to overcome the loss of insecticidal activity which occurs in hydrophilic siliceous materials which have been exposed to highly humid atmospheric conditions, thereby making possible a more extensive use of siliceous materials in insect pest control than has been heretofore possible.

Accordingly, it is one object of this invention to provide novel siliceous insecticidal compositions which do not readily lose their insecticidal activity under humid atmospheric conditions.

It is another object of this invention to provide improved novel inert insecticidal compositions which are nontoxic to human beings and warm blooded domestic animals.

It is a further object of this invention to provide methods of killing common insect pests.

Still further objects and advantages of the present invention will become apparent from the following description and the appended claims.

The present invention is based in part on the discovery that insects are effectively killed even under highly humid conditions when they are contacted with certain nontoxic or physiologically inert, partially to completely hydrophobic, amorphous siliceous materials having an electrical conductivity of not more than $10^{-7}$ mho per centimeter at a bulk density of 0.2 gram per cubic centimeter.

Thus roaches, termites, beetles, fleas, weevils, mites and other common insect pests may be effectively exterminated when the insects are contacted, directly or indirectly, with these materials. In contrast to the hydrophilic siliceous materials of the prior art, which become insecticidally ineffective within a short period of time in the ambient atmospheric humidity present under conditions generally found in insect infestations, the partially to completely hydrophobic siliceous materials of the present invention retain their insecticidal activity for prolonged periods of time under such humid atmospheric conditions.

The method of killing the aforedescribed insect pests in accordance with the present invention comprises contacting a portion or all of the exo-skeleton of such insects with the partially to completely hydrophobic siliceous products of this invention. The contact may be accomplished directly, for example, by dusting or atomizing the siliceous materials in the air so that the material will fall on the insects, or indirectly by brushing, dusting or atomizing the materials on surfaces over which the insects will crawl and thus be contacted by such partially to completely hydrophobic siliceous materials. By way of example, wooden joists or attic beams infested with termites can be dusted and the termites, in crawling over the joists or beams, will pick up sufficient amounts of such material to cause death. In the case, for example, of insect infested animals, such as dogs with fleas, or poultry infested with lice, these siliceous materials may be rubbed in, or dusted on, the coats of the dogs and/or feathers of the poultry to kill the fleas or lice and thereby remove the infestation without injury to the animals. Also, empty granaries may be "dusted" with the insecticidal partially to completely hydrophobic siliceous materials immediately prior to grain storage to control weevil infestation in the cereal grains subsequently stored. The cereal grains themselves may be dusted as they are being charged into granaries to prevent or remove weevil infestation in such cereal grains.

Almost any insect infested area may be treated with the inert insecticides of this invention and the infestation will usually disappear within several days. The prolonged insecticidal activity of the partially to completely hydrophobic siliceous materials will generally prevent reinfestation for periods up to several months depending upon the particular insect and environment. By way of contrast, where the hydrophilic siliceous materials of the prior art are used to combat such insect infestations only a portion of the infestation is removed and then usually for a period of one or two days and thereafter the reinfestation reappears in its initial strength. Thus the partially to completely hydrophobic siliceous materials are insecticidally more effective than the inert, hydrophilic siliceous dusts of the prior art and the siliceous materials of the present invention substantially retain insecticidal activity and low electrical conductivity under humid atmospheric conditions. Also, smaller quantities of the partially to completely hydrophobic siliceous materials will usually kill insects in shorter time periods than corresponding hydrophilic siliceous materials and the hydrophobic siliceous materials are insecticidally effective after exposure to humid atmospheric conditions, whereas corresponding hydrophilic materials generally quickly lose insecticidal activity after such exposure.

A wide variety of partially to completely hydrophobic siliceous materials can be used as insecticides in accordance with this invention, provided they have an electrical conductivity of not more than $10^{-7}$ mho per centimeter at a bulk density of 0.2 gram per cubic centimeter, including, for example, amorphous natural and synthetic silicon oxides which have been rendered partially to completely hydrophobic, for example, naturally occurring siliceous materials such as diatomaceous earth and sand which have been rendered partially to completely hydrophobic; synthetic silicon oxides such as precipitated silicas, fume silicas and silica aerogels which have been rendered partially to completely hydrophobic; natural and synthetic insoluble metal silicate salts such as naturally occurring and synthetically prepared barium, calcium and magnesium silicate which have been rendered partially to completely hydrophobic; and naturally occurring silicate clays such as kaolinite clays and montmorillonite clays, which clays are described in "The Colloid Chemistry of the Silicate Minerals," Academic Press, New York 1949, by C. E. Marshall, and include kaolin, talc, fuller's earth, bentonite and many others, which silicate clays have been made partially to completely hydrophobic.

Although any of the aformentioned classes of partially to completely hydrophobic siliceous materials may be useful as insecticidal materials, it has presently been found to be particularly advantageous in the preparation of the partially to completely hydrophobic siliceous materials of this invention to use as starting materials, synthetic silica or silicon dioxide such as, for example, the precipitated silicas described in U.S. Patent 2,496,736, issued to William T. Maloney, or, for example the fume silicas described in U.S. Patent 2,886,414, issued to R. N. Secord, or, for example, the silica aerogels described in U.S. Patent 2,093,454, issued to Samuel S. Kistler, and of these synthetic siliceous materials the silica aerogels are preferred.

The natural and synthetic amorphous siliceous materials which are used as starting materials in the preparation of the partially to completely hydrophilic materials are always hydrophilic and in order to be useful in accordance with the present invention they must be rendered, that is, converted, to partially or completely hydrophobic materials having the low electrical conductivity previously referred to herein. The term "hydrophilic siliceous materials" as used herein is intended to include only the synthetic and naturally occurring silica and silicates (including those described above) which are preferentially wetted by water when shaken in a mixture of water and n-butanol, or, stated differently, such silica and silicates will preferentially seek or remain in the water phase of such mixture. The hydrophilic siliceous materials may be rendered partially to completely hydrophobic in various ways, by using well-known hydrophobing agents or compositions, providing, of course, that the resulting material has a low electrical conductivity as herein defined.

The partially to completely hydrophobic materials may be prepared by coating or impregnating the hydrophilic siliceous materials with a suitable hydrophobing agent, for example, a fluid organosilicon compound such as a liquid organosilicon polymer, or with an organosilicon compound which forms in situ an organosilicon polymer or resin which is a liquid and/or a solid. Depending on the method employed and the organosilicon compound used, it may also be necessary to heat treat the coated or impregnated siliceous materials for appropriate periods of time in order to attain the necessary hydrophobic properties and/or the necessary low electrical conductivity properties. For example, heat or heating temperatures of from 60° C. to 800° C., but insufficient to decompose the hydrophobing agent, may be used for periods of two minutes to 24 hours with the shorter periods corresponding to the higher temperatures.

A specific procedure or embodiment of producing the partially to completely hydrophobic insecticidal siliceous materials of this invention comprises immersing in or otherwise wetting the hydrophilic siliceous material with a substantially anhydrous solution of a hydrophobing agent, for example, an appropriate hydrophobing organosilicon oil or liquid, in an organic liquid which is a solvent for such agent. It is also possible, if the agent is liquid, to treat the hydrophilic siliceous material with the agent per se. The material so treated by either of these procedures is then separated from the liquid or solution containing the hydrophobing agent. If the organic liquid or solvent used is relatively volatile, the treated siliceous material may be allowed to dry by standing or by gentle heating, for example, at temperatures of 30° C. to 60° C. The resulting material may be sufficiently hydrophobic and have the low electrical conductivity to be useful as an insecticide in accordance with the present invention, but if improvement in these properties is necessary, such improvement can be obtained by heat treating the materials as described above. Also if the hydrophobing process results in agglomeration of the particles of siliceous material, or the material is composed of coarse particles before treatment, it is usually necessary to comminute or grind the particles until they have an aggregate particle size below 50 microns and preferably below 20 microns.

The hydrophilic siliceous materials of this invention can be rendered partially to completely hydrophobic during a comminuting operation with a fine spray comprising droplets of the hydrophobing agent, for example, a hydrophobing organosilicon compound, or comprising droplets of a substantially anhydrous solution of the hydrophobing agent in an organic liquid which is a solvent for the agent. It is preferred, however, to use liquid hydrophobing agents per se, particularly liquid, hydrophobing organosilicon compounds.

It is also possible and may sometimes be desirable to render the hydrophilic siliceous materials partially to completely hydrophobic by exposing such materials to the vapors of one of the methyl chlorosilanes or to mixtures thereof. Thus it is possible to use monomethyl trichlorosilane, dimethyl dichlorosilane, trimethyl monochlorosilane, or a mixture of such compounds may be employed. For best results the silane vapors should be diluted with a gas and preferably with a gas which does not support combustion, such as nitrogen, to eliminate explosion hazards. However, air may be used with reasonable safety, when only small amounts of the hydrophilic siliceous materials are being treated.

In the course of the treatment of the siliceous materials some hydrogen chloride is formed as a result of hydrolysis of the chlorosilanes with the water layer usually found adsorbed on the surfaces of hydrophilic materials. If it is desired to remove such hydrogen chloride, this can be accomplished by exposing the treated siliceous materials to a stream of air heated to about 300° C., or as an alternative the hydrogen chloride may be neutralized to form ammonium chloride which is less harmful than hydrogen chloride, by gassing with NH$_3$ until the odor of NH$_3$ persists. The process of treating silica aerogels with methyl chlorosilanes or mixtures thereof described in this paragraph and the preceding paragraph is described in greater detail in U.S. Patent No. 2,589,705 of Samuel S. Kistler, granted March 18, 1952, the disclosure of which patent is incorporated herein by reference.

The organosilicon treated siliceous materials are preferably heated at elevated temperatures for varying periods of time as described above. For example, the treated or coated siliceous materials may be heated at atmospheric or subatmospheric pressure at temperatures of 60° C. to 800° C. for periods of two minutes to 24 hours, with the longer periods corresponding to the lower temperatures. However, it has been found preferable to heat such materials at temperatures of 100° C. to 500° C. for from 3 to 10 minutes.

In coating or impregnating the siliceous materials with the hydrophobing agent, the amount of such agent used will vary depending upon the size of the particles, the surface area of the comminuted siliceous material and the degree of hydrophobicity desired in the end product. Hydrophobic siliceous materials having a specific surface area of from 40 to 500 square meters per gram may be prepared by treating the corresponding hydrophilic siliceous materials of such surface area with from about 3%–20% by weight, based on the weight of the uncoated particles, of the hydrophobing agent, depending upon the particular agent used and the surface area and particle size of the hydrophilic siliceous materials. In such instances, the siliceous particles have a continuous or substantially continuous coating or film of the hydrophobing agent.

In a preferred embodiment of this invention, a comminuted hydrophilic silica aerogel having surface area of from 100–250 square meters per gram is coated with from about 3% to 20% by weight (based on the weight of the uncoated particles) of a hydrophobing organosilicon compound, preferably a dimethyl silicone oil. The surface area of the comminuted silica aerogels or other siliceous materials may be measured by the method of Brunauer, Emmett and Teller described in the advances in Colloid Science, volume I, pages 1–36 (1942), published by Interscience Publishers, Inc., New York City, New York. The grinding or comminuting operation may be carried out using an air grinding or air attrition mill, for example, of the type illustrated in FIGURES 51 on page 1145 of Chemical Engineers' Handbook (3rd edition), published by McGraw-Hill, New York City, New York.

Although a variety of hydrophobing or organosilicon compounds can be used in the practice of this invention, it has been found desirable to use halosilanes and polysiloxanes for coating or impregnating the hydrophilic siliceous materials to produce the partially to completely hydrophilic silicon material. It has been found desirable in the case of halosilanes to use those halosilanes described in U.S. Patent 2,589,705, issued to Samuel S. Kistler, previously referred to herein. However, in the preferred embodiment of this invention it has been found preferable to coat siliceous materials with silicone oils or polysiloxane oils, particularly those silicone oils which have the following formula:

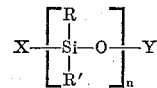

wherein R and R' represent alkyl, aryl, alkaryl and aralkyl radicals and mixtures thereof, and wherein X and Y represent alkyl radicals, alkoxy radicals and halogen, particularly chlorine, wherein "$n$" is a positive integer of at least 8, and preferably 10 or higher. The preferred compounds having the above structure or formula are those in which the ratio of the number of carbon-silicon linkages to the number of silicon atoms in such compound is in the range of from 2.0 to 2.25, and preferably in the range of 2.0 to 2.2. It is also desirable to employ silicone oils having the above formula and properties and which also have a viscosity, at a temperature of 100° C., in the range of 30 to 50 centistokes, preferably in the range of 38 to 42 centistokes.

A preferred class of silicone oils are the dimethyl silicone oils which are prepared by the hydrolysis of dimethyldichlorosilane, or by the cohydrolysis of dimethyldichlorosilane and trimethylmonochlorosilane, or by the catalytic equilibration of a mixture of cyclic dimethylsiloxanes and hexamethyldisiloxane with a minor proportion of sulfuric acid. Such dimethyl silicone oils and methods for preparing dimethyl silicone oils are described on pages 82 through 88 of "The Chemistry of the Silicones" by Rochow (1951), 2nd edition, published by John Wiley and Sons, New York.

The more effective, dry, inert hydrophobic siliceous insecticides of this invention are characterized in being finely divided, in having a low bulk density, that is a low unit weight per unit volume of uncompressed siliceous materials and in having a low electrical conductivity or, differently stated, having electrical insulating properties. The particles of these materials have a low electrical conductivity as previously defined herein and readily pick up electrostatic charges and the particles of such materials then tend to repel each other. The resulting mass of material consequently increases in volume or bulk and contains substantial amounts of air interspersed between the particles of the materials. The density of such electrostatically charged materials which have a maximum electrostatic charge on the siliceous particles is then very low and is variously referred to as the "loose," "absolute" or "uncompressed" bulk density. The electrical conductivity of such materials usually decreases with the decrease in density.

The particles of the partially to completely hydrophobic siliceous materials of this invention readily pick up and retain the above referred to electrostatic charges. When the aggregate particle size is below 15 microns and the surface area of the material is between 100 and 250 square meters per gram, such materials generally have an "uncompressed" bulk density of from 0.05 to 0.17 gram per cubic centimeter when measured by standard methods. The hydrophobic siliceous materials of this invention, at an "absolute" bulk density have an extremely low electrical conductivity which is not susceptible to measurement since the electrical contact plates used in such measurement effect some compression of the material, thereby altering the bulk density. The electrical conductivity of finely divided compressed materials may be measured and calculated by a variety of methods such as those described in "Electrical Measurements," chapter 7, John Wiley and Sons, New York, 1957, by John S. Harris. It has been presently found practicable to measure the relative specific electrical conductivity of the partially to completely hydrophobic and hydrophilic siliceous materials of this invention at a compressed bulk density of 0.2 gram per cubic centimeter using the flat probe of a Model 168 D–K Analyser which can be procured from the Delsen Corporation of Glendale, California. It may be desirable in some instances to use the G–5 Moisture Register which can be procured from the Moisture Register Company of Alhambra, California.

Where the materials have an uncompressed bulk density of less than 0.2 gram per cubic centimeter, the materials prior to making the aforementioned electrical conductivity measurements, are compressed by well-known means such as, for example, by tapping or by weight compression until their compressed density is 0.2 gram per cubic centimeter. After electrical measurements are made at this density, using either of the aforedescribed instruments, the specific conductivity can be readily calculated by methods described in "Electrical Measurements" mentioned above.

In the case of materials which have an uncompressed bulk density greater than 0.2 gram per cubic centimeter, it is usually necessary to comminute or otherwise reduce the particle size of the material so that the bulk density is reduced below 0.2 gram per cubic centimeter. This is desirable not only to measure the electrical conductivity at a density of 0.2 gram per cubic centimeter but also to render the material satisfactory for insecticidal purposes.

The electrical conductivity of a wide variety of hydrophobic and hydrophilic siliceous materials can be measured by the above-described methods. The electrical conductivity of samples of such materials can be measured prior and subsequent to exposure to humid atmospheric conditions and the effect of such exposure on the electrical conductivity of the materials can be determined.

Although a variety of finely divided partially to completely hydrophobic siliceous materials may be used as insecticides in accordance with the present invention, it has been presently found preferable to use as insecticidal materials the aforedescribed partially to completely hydrophobic siliceous materials whose particles have a surface area of from 40 to 500 square meters per gram and which also have an aggregate particle size of between 0.01 and 15 microns. Such particulate materials preferably consist of particles of which at least 70% are between 1 and 5 microns in size, preferably between 1 and 3 microns, about 10% are below 1 micron, and the remainder between 6 and 15 microns and where the average particle size is from 2–4 microns. It is further preferable to employ those materials which have a bulk density of from 0.117 to 0.400 gram per cubic centimeter but preferably less than 0.200 gram per cubic centimeter.

The partially to completely hydrophobic siliceous materials of this invention may be mixed with or incorporated with any and all of the uncoated hydrophilic synthetic or natural siliceous materials hereinbefore described to provide economical improved inert insecticides which retain their insecticidal activity for prolonged periods of time provided that the resultant composition has an electrical conductivity of not more than $10^{-7}$ mho per centimeter at a bulk density of 0.2 gram per cubic cm. Thus any of the partially to completely hydrophobic siliceous materials may be incorporated with less expensive, finely divided hydrophilic, siliceous materials such as those previously described, for example, natural or synthetic silicon oxides, natural or synthetic insoluble metal silicates and naturally occurring silicate clays to provide effective insecticidal compositions which do not readily lose their effectiveness under humid conditions. The amount of partially to completely hydrophobic siliceous material in such compositions may vary considerably, but it is necessary to use an amount which will provide insecticidal properties when the compositions are exposed to humid atmospheric conditions. For most purposes, it is usually necessary to employ at least 65% by weight, and preferably at least 75% or more by weight, of such partially to completely hydrophobic siliceous material in such compositions.

The partially to completely hydrophobic siliceous insecticide materials of this invention may also be incorporated with the anhydrous form of a hydrostable, non-deliquescent, inorganic salt, such as for example calcium sulphate, copper sulphate, aluminum sulphate, sodium tripolyphosphate, sodium metasilicate and the like to provide insecticidal compositions which are usually effective for long periods of time.

When a composition containing one of the aforedescribed partially to completely hydrophobic siliceous materials and an anhydrous hydratable non-deliquescent inorganic salt, such as, for example sodium tripolyphosphate, copper sulphate, calcium sulphate, aluminum sulphate, aluminum chloride or sodium metasilicate is desired, an effective composition may be obtained by combining not less than 90% by weight, preferably not less than 95% by weight of a partially to completely hydrophobic siliceous insecticide and not more than 10%, preferably not more than 5% of a dry, hydratable, non-deliquescent salt.

It has also been found possible to combine one or more of the hydrophilic siliceous materials and one or more of such anhydrous hydratable non-deliquescent salt with one or more of the above-described partially to completely hydrophobic siliceous materials to provide effective insecticidal compositions. In all of these insecticidal compositions the hydrophilic siliceous materials and the inorganic salts should be limited to provide compositions which have and will retain, after some exposure to humid atmospheric conditions, a specific electrical conductivity of not more than $10^{-7}$ mho per centimeter at a bulk density of 0.2 gram per cubic centimeter. Such compositions are economical, will not lose insecticidal activity when exposed to humid atmospheric conditions for periods up to 3 days, and are more effective as insecticides for a given volume of material, than the hydrophilic siliceous dusts of the prior art.

When a composition containing a partially to completely hydrophobic siliceous insecticide, a dry untreated hydrophilic siliceous material and an anhydrous hydratable non-deliquescent inorganic salt is desired, an effective composition may be obtained by combining not less than 65% by weight, preferably not less than 75% by weight, of a partially to completely hydrophobic siliceous material, not less than 25% by weight, preferably not less than 30% by weight, of a dry untreated hydrophilic siliceous material and not more than 10% by weight, preferably not more than 5% by weight, of an anhydrous, hydratable non-deliquescent inorganic salt.

In some instances and under isolated conditions of use, it may be desirable to incorporate in the above-mentioned compositions, a physiologically poisonous insecticide such as, for example, arsenic, sodium fluoride, Chlordane, Lindane or DDT, thereby providing a product which has a "double barreled effect" and which will kill insects more rapidly due to the presence of such physiological poisons. However, when such physiological poisons are added to the inert insecticidal siliceous compositions, the latter may be rendered toxic to warm blooded animals and human beings and the advantage of the lack of toxicity inherent in the inert siliceous insecticides is usually sacrificed. Also, the resulting composition will be less economical to manufacture and will be more expensive to use. The amount of any of the above-described physiologically poisonous materials which may be incorporated in the inert hydrophobic siliceous insecticides of this invention will be subject to wide variation depending upon the type of insect and the particular infestation to be treated. However the amount of any of such poisonous materials which may be incorporated in the inert insecticides will almost always be less than 50% by weight and almost always be less than 25% by weight of the amount of such materials which are ordinarily used in the usual commercial poisonous insecticides.

A general procedure for preparing any of the above-described compositions comprises intimately mixing a sufficient quantity of one of the partially to completely hydrophobic siliceous materials previously described such as silica aerogel with a hydrophilic siliceous material previously described such as, for example, a kaolinite clay such as kaolin and/or an anhydrous, hydratable, non-deliquescent inorganic salt previously described such as, for example, sodium tripolyphosphate or aluminum sulfate. A preferred procedure comprises mixing such materials and while mixing or immediately thereafter, charging the materials or mixtures thereof to an air attrition mill such as previously referred to, to provide an inert insecticidal composition having a surface area in the range of 100–250 square meters per gram, an aggregate particle size of below 15 microns and a specific electrical conductivity of not more than $10^{-7}$ mho per centimeter at a bulk density of 0.2 grams per cubic centimeter. Siliceous compositions containing one or more of the aforedescribed physiologically poisonous insecticides may also be prepared in the manner described herein.

A preferred specific embodiment of this invention, but not in any sense intending to limit the scope thereof, comprises intimately mixing and grinding or comminuting (1) 75% by weight of hydrophobic silica aerogel having a surface area of from 200 to 300 square meters per gram, a bulk density of about 0.125 gram per cubic centimeter and a specific electrical conductivity of $10^{-16}$ mho per centimeter at a bulk density of 0.2 gram per cubic centimeter and containing about 7.0% by weight of a dimethyl silicone oil and (2) 25% by weight of a dry hydrophilic kaolin (USP) having a surface area of about 50 square meters per gram and a specific electrical conductivity of $4\times10^{-11}$ mho per centimeter at a bulk density of 0.4 gram per cubic centimeter. When such materials are prepared, mixed and ground or comminuted as described heretofore, there is provided a siliceous insecticidal composition having a surface area in the range of from 100 to 250 square meters per gram, a bulk density of about 0.170 gram per cubic centimeter, which has a specific electrical conductivity of between $10^{-13}$ and $10^{-14}$ mho per centimeter at a compressed bulk density of 0.2 gram per cubic centimeter and which may be insecticidally effective for as long as four days under humid atmospheric conditions against insects such as roaches, termites, beetles, fleas, weevils and mites.

A further understanding of the products and processes of this invention will be obtained from the following specific examples which are intended to illustrate the invention but not to limit the scope thereof.

EXAMPLE A

A synthetic, amorphous, hydrophilic, commercial silica aerogel (a silica aerogel sold by Monsanto Chemical Co. under the trademark Santocel) and having a specific surface area of 150 square meters per gram and an aggregate particle size below 15 microns was supplied to a small grinding device of the type illustrated in FIGURE 51 on page 1145 of the Chemical Engineers' Handbook (3rd edition), published by McGraw-Hill of New York, at the rate of 56 grams per minute for a period of 25 minutes. Simultaneously, in each instance 100 grams of a dimethyl silicone oil was sprayed into a straight section of the grinding device at a rate of 4 grams per minute over the same 25 minute period. At the end of this period of time the grinding was discontinued and the treated silica aerogel was heated in an oven at a temperature of 300° C. for 10 minutes.

The resultant product was a hydrophobic silica aerogel containing about 7.0% by weight of the dimethyl silicone oil and having a surface area of 300 square meters per gram, a loose bulk density of 0.125 gram per cubic centimeter, a specific electrical conductivity of $10^{-16}$ mho per centimeter at a bulk density of 0.2 gram per cubic centimeter, an aggregate particle size of below 15 microns wherein the average particle size was between 1 and 3 microns.

A synthetic, amorphous, hydrophilic, commercial fume silica (a fume silica sold under the trademark Cab-O-Sil) having a specific surface area of about 250 square meters per gram and an average particle size of about 1 micron was supplied to the aforedescribed grinding device along with the dimethyl silicone oil in the amounts and rates of the silica aerogel and heated at the same temperature and for the same time period described for the silica aerogel (in the first paragraph of this example) to provide a hydrophobic fume silica containing 7.0% by weight of the dimethyl silicone oil having a surface area of about 350 square meters per gram, a loose bulk density of about 0.13 gram per cubic centimeter, and an aggregate particle size below 10 microns, wherein the average particle size was between 1 and 2 microns.

A naturally occurring amorphous hydrophilic Wyoming bentonite (USP) having a specific surface area of about 100 square meters per gram was treated with dimethyl silicone oil in the amounts and manner prescribed for the silica aerogel (in the first paragraph of this example) to provide a hydrophobic bentonite containing about 7.0% by weight of the dimethyl silicone oil and having a surface area of about 200 grams per square meter, a loose bulk density of about 0.17 gram per cubic centimeter and a specific electrical conductivity of $10^{-13}$ mho per centimeter at a bulk density of 0.2 gram per cubic centimeter and an aggregate particle size of about 15 microns wherein the average particle size was from 5 to 7 microns.

A naturally occurring amorphous hydrophilic kaolin (USP) having a specific surface area of about 40 square meters per gram was treated with dimethyl silicone oil in the manner previously described in the treatment of silica aerogel to provide a hydrophobic kaolin containing about 7.0% by weight of the dimethyl silicone oil and having a specific surface area of 50 square meters per gram and a loose bulk density of 0.35 gram per cubic centimeter, a specific electrical conductivity of $10^{-13}$ mho per centimeter at a bulk density of 0.4 gram per cubic centimeter and an aggregate particle size of about 15 microns wherein the average particle size was between 5 and 6 microns.

Electrical conductivities of the four hydrophobic siliceous materials were determined using the heretofore described Model 168 D-K Analyser. The hydrophobic silica aerogel, fume silica and bentonite, all of which had uncompressed bulk densities below 0.2 gram per cubic centimeter were respectively compressed to a bulk density of 0.2 gram per cubic centimeter at which density the respective electrical conductivities were measured. The hydrophobic kaolin, which had a bulk density of 0.35 gram per cubic centimeter was compressed to a bulk density of 0.4 gram per cubic centimeter and the electrical conductivity measured at this higher density using the above-described instrument.

Portions of each of the four siliceous materials were exposed to 100% relative humidity at a temperature of 30° C. for 24 hours. Thereafter samples of each of the four hydrophobic siliceous materials, which had been exposed and samples of the materials which had not been exposed to the 100% relative humidity were evaluated for insecticidal activity in accordance with the procedures described in Example I below along with samples of corresponding untreated hydrophilic siliceous materials e.g. untreated silica aerogel, fume silica, bentonite and kaolin.

The effects of exposure to 100% relative humidity on the electrical conductivity and on the insecticidal activity of the above-described siliceous materials are shown in the following table.

species. In these experiments, all of the hydrophobic materials, that is the hydrophobic aerogel, fume silica, bentonite and kaolin, including those hydrophobic materials which had been exposed to 100% relative humidity, killed 100% of all insects within 15 minutes. The corresponding dry hydrophilic siliceous materials which had not been exposed to the 100% relative humidity were effective against the termite and roach insect species and were partially effective against the red flour beetle and two

*Table I*

SPECIFIC ELECTRICAL CONDUCTIVITY OF SILICEOUS MATERIALS AT A BULK DENSITY OF 0.2 GRAM PER CUBIC CENTIMETER

| Material | Electrical Conductivity | | Insecticidal Activity |
|---|---|---|---|
| | 0% Relative Humidity | 100% Relative Humidity | |
| Untreated Silica Aerogel | $2.9 \times 10^{-10}$ | $7.7 \times 10^{-5}$ | Good. None. |
| Silica Aerogel treated with Silicone Oil | $10^{-16}$ | $10^{-16}$ | Good. Do. |
| Untreated Fume Silica | $7 \times 10^{-10}$ | $10^{-6}$ | Do. None. |
| Fume Silica treated with Silicone Oil | $10^{-13}$ | $10^{-13}$ | Good. Do. |
| Untreated Bentonite | $1.6 \times 10^{-11}$ | $2.1 \times 10^{-2}$ | Do. None. |
| Bentonite treated with Silicone Oil | $10^{-13}$ | $7.7 \times 10^{-8}$ | Good. Do. |
| *Untreated Kaolin | $4 \times 10^{-11}$ | $3.3 \times 10^{-7}$ | Do. Fair. |
| *Kaolin treated with Silicone Oil | $10^{-13}$ | $10$ $10^{-12}$ | Good. Do. |

* Specific Electrical Conductivity Measured at a bulk density of 0.4 gram per cubic centimeter.

The data in the above table demonstrate that the treated hydrophobic siliceous materials, that is the hydrophobic silica aerogel, fume silica, bentonite and kaoline were insecticidally effective and had a low electrical conductivity and that both of these properties were substantially unaffected by exposure to 100% relative humidity for twenty-four hours whereas the corresponding untreated hydrophilic siliceous materials, while insecticidally effective when dry, lost this property after exposure to 100% relative humidity for 24 hours. The loss of insecticidal activity in these untreated hydrophilic materials was also accompanied by a significant increase in electrical conductivity as shown in Table I.

An empirical method which may be used for rapidly screening inert siliceous insecticides is based on an electrostatic charge which develops on siliceous particles having a low electrical conductivity when such particles are agitated in a container such as a glass graduated cylinder. When the partially to completely hydrophobic siliceous materials of the present invention have a specific electrical conductivity of $10^{-5}$ mho per centimeter or less, such particles will cling to the walls of the container in which they are agitated. This property which may be referred to as "clingability," persists for several hours where the siliceous materials have a specific electrical conductivity less than $10^{-7}$ mho per centimeter and such materials have been found to be insecticidally effective in all instances.

EXAMPLE I

The materials of Example A were evaluated for insecticidal effectiveness against a termite specie, a roach specie, the red flour beetle and the two spotted spider mite. In one series of experiments, each material was dusted directly on ten insects of each of the above insect species.

spotted spider mite, killing 70% and 80%, respectively, of the insects of these species. The untreated hydrophilic silica aerogel, fume silica, bentonite and kaolin which had been exposed to 100% relative humidity were essentially ineffective and in no instance killed more than 30% of the insects in any of the species.

In a second series of experiments, hereinafter designated as Area Dusting Experiments, controlled amounts of each of the siliceous materials were deposited on a wood surface area and the various insect species were contacted with the materials by crawling through a known deposit of the respective materials for five minutes. As in the first series of experiments, all of the hydrophobic siliceous materials described in Example A were insecticidally effective and in no instance were less than 70% of the insects killed. The dry hydrophilic siliceous materials also killed 70% of the insects in each species. However, the hydrophilic materials which had been expsoed to 100% relative humidity killed only 20% and less of the insects of each species.

EXAMPLE II

Quantities of the hydrophobic silica aerogel, fume silica, bentonite, and kaolin prepared in Example A were mixed with comminuted dry, untreated, siliceous materials having substantially the same particle size as the treated siliceous materials and certain anhydrous hydratable, nondeliquescent inorganic salts, which were also of comparable particle size. Dry mixed compositions having specific electrical conductivities less than $10^{-7}$ mho per centimeter at bulk densities of 0.2 gram per cubic centimeter containing the following ingredients of the above classes of materials in the percentages given were prepared.

Table II
SILICEOUS COMPOSITIONS

| Ingredient | 1 | 2 | 3 | 4 | 5 | 6 | 7 | 8 | 9 | 10 | 11 | 12 |
|---|---|---|---|---|---|---|---|---|---|---|---|---|
| *T-Silica Aerogel | | 70 | | | 65 | | | | | 75 | | |
| *T-Fume Silica | 65 | | | | | 70 | | | 75 | | | |
| *T-Bentonite | | | 65 | | | | 70 | | | | 75 | |
| *T-Kaolin | | | | 70 | | | | 65 | | | | 75 |
| Untreated Silica Aerogel | | 20 | | | | | | 25 | | 15 | | |
| Untreated Fume Silica | 30 | | | | | | 25 | | 20 | | | |
| Untreated Bentonite | | | 25 | | | 30 | | | | | 20 | |
| Untreated Kaolin | | | | 25 | 20 | | | | | | | 15 |
| Copper Sulfate | 5 | | | | 10 | | | | | | | 10 |
| Calcium Sulfate | | 10 | | | 5 | | | | | | 5 | |
| Aluminum Chloride | | | 10 | | | | 5 | | | 10 | | |
| Sodium Metasilicate | | | | 5 | | | | 10 | 5 | | | |

*T=Treated, with dimethyl silicone oil.

The above-described compositions were evaluated against a termite specie, a roach specie, the red flour beetle and the two spotted spider mite. In one series of experiments, samples of the unexposed compositions which were kept dry and samples which had been exposed to a relative humidity of 100° C. for 12 hours were dusted directly on the insects. In a series of Area Dusting Experiments, such as referred to in Example I, controlled amounts of the same dry and humidified samples of hydrophobic siliceous materials described in Example A were deposited on a wood surface area and the various insects were allowed to crawl through a known deposit of the composition for 4 minutes.

All of the above-described compositions were insecticidally effective before and after exposure to 100% relative humidity, although in some instances a greater amount, that is about 40% more, in the case of materials which had been exposed to 100% relative humidity were required to achieve the insecticidal effect of the dried materials. The most effective compositions based on quantity of material required to effect a 95% insect kill were compositions 2, 5, 9 and 10. The insecticidal effectiveness of these materials was not appreciably changed by exposure to 100% relative humidity and, in the Area Dusting Experiments where the quantities of siliceous dusts could be controlled, about 1–2 milligrams of siliceous dust per square centimeter killed 95–100% of the individual in the above insect species. Compositions 3–8 containing 65% of the hydrophobic silicate clays, e.g., hydrophobic bentonite and hydrophobic kaolin, were the least effective, requiring 3–4 milligrams of dust per square centimeter.

Similar compositions differing in that they contained only hydrophilic siliceous materials were insecticidally effective in amounts of 3–4 milligrams per square centimeter when dry, but after exposure to 100% relative humidity as above described, such compositions were ineffective as insecticides when 30–40 milligrams per square centimeter were applied to the insects permitted to crawl through an area over which a material had been dusted.

EXAMPLE II

Quantities of the treated hydrophobic siliceous materials prepared in Example A were mixed with dry, untreated hydrophilic siliceous materials having substantially the same surface area and particle size as the treated hydrophobic siliceous materials and certain anhydrous hyratable, non-deliquescent inorganic salts as shown in the table. Dry mixed compositions having specific electrical conductivities less than $10^{-7}$ mho per centimeter at bulk densities of 0.2 gram per cubic centimeter containing the following ingredients in the percentages given were prepared.

Table III

| Ingredient | 13 | 14 | 15 | 16 | 17 | 18 | 19 | 20 |
|---|---|---|---|---|---|---|---|---|
| *T-Silica Aerogel | | 65 | 75 | | | 70 | 65 | |
| *Fume Silica | 65 | | | 75 | 70 | | | 65 |
| Untreated Bentonite | 25 | | | | | | | |
| Untreated Kaolin | | 25 | | | | | | |
| Untreated Calcium Silicate | | | 20 | | 25 | | 25 | |
| Untreated Magnesium Silicate | | | | 20 | | 25 | | 25 |
| Sodium Tripolyphosphate | 10 | | | | | | 10 | |
| Aluminum Sulfate | | 10 | | | 5 | 5 | | 10 |
| Calcium Sulfate | | | | 5 | | | | |
| Aluminum Chloride | | | 5 | | | | | |

*T=Treated, with dimethyl silicone oil.

The above-described compositions were evaluated for insecticidal activity using the insect species controls and procedures of Example I. All of the above compositions, both dry and moisturized by exposure to 100% relative humidity, were insecticidally effective. The insecticidal effectiveness of compositions 14, 15, 16, 18 and 19 was substantially unimpaired by exposure to 100% relative humidity. Compositions 13, 17 and 20 were slightly affected by this humidity but were still insecticidally effective. Compositions 14, 15, 16, 18 and 19 effectively killed the insects, e.g., termites, roaches, red flour beetle and two spotted spider mite, when 2 milligrams or less of siliceous dust per square centimeter was dusted on the wood in Area Dusting Experiments as described in Example I regardless of whether or not they were exposed to the aforementioned humidity. Portions of compositions 13, 17 and 20, which were not exposed to the high relative humidity, were as effective as compositions 14, 15, 16, 18 and 19. However, after exposure to 100% relative humidity, compositions 13, 17 and 20 required 2–3 milligrams of dust per square centimeter to match the 95% kill accomplished by the aforementioned compositions 14, 15, 16, 18 and 19.

Corresponding compositions, wherein the hydrophobic siliceous materials were replaced with corresponding hydrophilic siliceous materials were tested as in Example I and the results were negative, that is, there was no insect kill after exposure to 100% relative humidity.

In the above examples it was noted that a loss of body weight occurred in all the insects during the period after treatment and prior to death. It was noted also the insecticidally effective siliceous materials tended to cling in large quantities to the bodies of the insects in contrast to the "moisturized" hydrophilic siliceous materials wherein only small quantities of the materials adhered to the bodies of the insects. The exact mechanism of insecticidal action by siliceous compositions containing hydrophobic siliceous materials is not known with certainty and the role of such "hydrophobic" siliceous materials in insect dessication is not explained.

EXAMPLE III

Quantities of the hydrophobic siliceous materials prepared as in Example A were mixed in several instances with dry, untreated hydrophilic siliceous materials and in other instances with certain anhydrous hydratable non-deliquescent salts. Dry mixed compositions containing the following ingredients in the percentages given were prepared.

*Table IV*

| Ingredient | Composition | | | | | | | |
|---|---|---|---|---|---|---|---|---|
| | 21 | 22 | 23 | 34 | 25 | 26 | 27 | 28 |
| *T-Silica Aerogel | 80 | 75 | | | 90 | | | 93 |
| *Fume Silica | | | 75 | 80 | | 90 | 93 | |
| Untreated Bentonite | 20 | | 25 | | | | | |
| Untreated Kaolin | | 25 | | 20 | | | | |
| Sodium Tripolyphosphate | | | | | 10 | 10 | | |
| Aluminum Sulfate | | | | | | | 7 | 7 |

* T=made hydrophobic with a dimethyl silicone oil as in Example A.

The physical properties, measured as described heretofore, of compositions 21–28 are shown below.

*Table V*

| Composition No. | *Electrical Conductivity, mho per centimeter | | Uncompressed Bulk Density, gm./cc. | Surface Area (meters/gm.) | Avg. Particle Size, Micron |
|---|---|---|---|---|---|
| | 0% RH | 100% RH | | | |
| 21 | $10^{-14}$ | $10^{-14}$ | 0.155 | 350 | 2.5 |
| 22 | $10^{-14}$ | $10^{-13}$ | 0.168 | 325 | 3.0 |
| 23 | $10^{-13}$ | $10^{-12}$ | 0.189 | 300 | 3.0 |
| 24 | $10^{-13}$ | $10^{-13}$ | 0.168 | 325 | 3.0 |
| 25 | $10^{-16}$ | $10^{-15}$ | 0.134 | 375 | 2.0 |
| 26 | $10^{-13}$ | $10^{-13}$ | 0.139 | 350 | 2.5 |
| 27 | $10^{-13}$ | $10^{-13}$ | 0.133 | 375 | 2.0 |
| 28 | $10^{-14}$ | $10^{-16}$ | 0.125 | 400 | 2.0 |

*Determined at a bulk density of 0.200 gram per cubic centimeter.

Determined at a bulk density of 0.200 gram per cubic centimeter.

The above-described insecticides were evaluated as in Examples I and II and were found to be effective, that is, to kill from 95% to 100% of all insects. Thus, these insecticides had the same effectiveness under all the various test conditions before and after a prolonged 48 hour exposure to an atmosphere of 100% humidity.

When amorphous calcium silicate, amorphous magnesium silicate and amorphous precipate silica were made partially to completely hydrophobic as herein described, such materials, alone or incorporated with hydrophilic siliceous materials and/or anhydrous hydratable non-deliquescent salts as in Examples I and II were insecticidally effective after exposure to 100% relative humidity. When untreated or hydrophilic calcium silicate and magnesium silicate were incorporated in like compositions, replacing hydrophobic siliceous materials, the resulting compositions were effective when kept in a dry atmosphere but were ineffective after exposure to 100% relative humidity for several hours.

What is claimed is:

1. The method which comprises contacting insects with a partially to completely hydrophobic particulate amorphous siliceous material having a specific electrical conductivity of not more than $10^{-7}$ mho per centimeter at a bulk density of 0.2 gram per cubic centimeter.

2. The method of claim 1 wherein the particulate siliceous material is a partially to completely hydrophobic silica aerogel containing from 3% to 20% by weight of an organosilicon compound and has a specific surface area of from 100 to 500 square meters per gram and an aggregate particle size below 15 microns.

3. The method of claim 1 wherein the particulate siliceous material is a partially to completely hydrophobic fume silica containing from 3% to 20% by weight of an organosilicon compound and has a specific surface area of from 100 to 500 square meters per gram and an aggregate particle size below 15 microns.

4. The method of claim 1 wherein the particulate siliceous material is a partially to completely hydrophobic precipitated silica containing from 3% to 20% by weight of an organosilicon compound and has a specific surface area of from 100 to 500 square meters per gram and an aggregate particle size below 15 microns.

5. The method of claim 1 wherein the particulate siliceous material is a partially to completely hydrophobic kaolin containing from 3% to 20% by weight of an organosilicon compound and has a specific surface area of from 100 to 500 square meters per gram and an aggregate particle size below 15 microns.

6. The method of claim 1 wherein the particulate siliceous material is a partially to completely hydrophobic bentonite containing from 3% to 20% by weight of an organosilicon compound and has a specific surface area of from 100 to 500 square meters per gram and an aggregate particle size below 15 microns.

7. The method which comprises contacting insects with hydrophobic, amorphous particulate silica aerogel, containing from 3% to 20% by weight of dimethyl silicone oil and having a specific electrical conductivity of not more than $10^{-7}$ mho per centimeter at a bulk density of 0.2 gram per centimeter, said hydrophobic aerogel being further characterized in having a specific surface area of from 100 to 500 square meters per gram and an aggregate particle size below 15 microns.

8. The method which comprises contacting insects with a composition comprising a partially to completely hydrophobic particulate siliceous material and a particulate anhydrous, hydratable, non-deliquescent inorganic salt, said composition having a specific electrical conductivity of not more than $10^{-7}$ mho per centimeter at a bulk density of 0.2 gram per cubic centimeter, and wherein the said hydrophobic siliceous material is present in a quantity sufficient to provide an insecticidal composition.

9. The method which comprises contacting insects with a composition comprising a partially to completely hydrophobic particulate siliceous material and a hydrophilic particulate siliceous material, said composition having a specific electrical conductivity of not more than $10^{-7}$ mho per centimeter at a bulk density of 0.2 gram per cubic centimeter and wherein the said hydrophobic siliceous material is present in a quantity sufficient to provide an insecticidal composition.

10. The method which comprises contacting insects with a composition comprising a partially to completely hydrophobic particulate siliceous material, a hydrophilic particulate siliceous material and a particulate, anhydrous, hydratable non-deliquescent inorganic salt, said composition having a specific electrical conductivity of not more than $10^{-7}$ mho per centimeter at a bulk density of 0.2 gram per cubic centimeter and wherein the said hydrophobic siliceous material is present in a quantity sufficient to provide an insecticidal composition.

11. A composition of matter comprising (1) a partially to completely hydrophobic particulate siliceous material and (2) from about 5% to not more than about 10% by weight of said composition of a finely divided, anhydrous, hydratable, non-deliquescent inorganic salt, said composition being characterized in having an electrical conductivity of not more than $10^{-7}$ mho per centimeter at a bulk density of 0.2 gram per centimeter.

12. A composition of claim 11 wherein the partially to completely hydrophobic particulate siliceous material is hydrophobic siliceous material containing from 3% to 20% by weight of a hydrophobic organosilicon compound having the following formula:

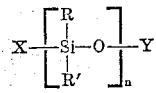

wherein R and R' are selected from the group consisting of alkyl, aryl, alkaryl, aralkyl radicals and combinations thereof and X and Y are selected from the group consisting of alkyl radicals, alkoxy radicals, halides and combinations thereof and wherein "$n$" is a number of at least 10, said hydrophobic siliceous material being further characterized in having a specific surface area of from 100–500 square meters per gram and an aggregate particle size below 15 microns.

13. A composition of claim 11 wherein the partially to completely hydrophobic siliceous material is a silica aerogel containing from 3% to 20% by weight of a liquid hydrophobic organosilicon compound having the following formula:

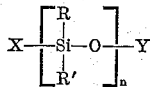

wherein R and R' are radicals selected from the group consisting of alkyl, aryl, alkaryl, aralkyl radicals and combinations thereof and X and Y are selected from the group consisting of alkyl radicals, alkoxy radicals, halides and combinations thereof and wherein "$n$" is a number of at least 10, said hydrophobic silica aerogel being characterized in having a specific surface area of from 100–500 square meters per gram and an aggregate particle size below 15 microns.

14. A composition of claim 11 wherein the partially to completely hydrophobic particulate siliceous material is fume silica containing from 3 to 20% by weight of a hydrophobic organosilicon compound having the following formula:

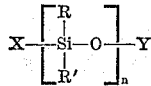

wherein R and R' are selected from the group consisting of alkyl, aryl, alkaryl, aralkyl radicals and combinations thereof and X and Y are selected from the group consisting of alkyl radicals, alkoxy radicals, halides and combinations thereof and wherein "$n$" is a number of at least 10, said hydrophobic siliceous material being characterized in having a specific surface area of from 100–500 square meters per gram and an aggregate particle size below 15 microns.

15. A composition of matter comprising (1) not less than 65% by weight of a partially to completely hydrophobic particulate siliceous material and (2) not more than 35% by weight of a hydrophilic particulate siliceous material; said composition having an electrical conductivity of not less than $10^{-7}$ mho per centimeter at a bulk density of 0.2 gram per cubic centimeter.

16. A composition of claim 15 wherein the partially to completely hydrophobic siliceous material is hydrophobic siliceous material containing from about 3% to about 20% by weight of an organosilicon compound having the following formula:

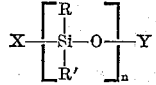

wherein R and R' are radicals selected from the group consisting of alkyl, aryl, alkaryl and aralkyl radicals and combinations thereof and X and Y are selected from the group consisting of alkyl and alkoxy radicals, halides and combinations thereof and wherein "$n$" is at least 10, said hydrophobic siliceous material being characterized in having a specific surface area of from 100–500 square meters per gram and an aggregate particle size below 15 microns.

17. A composition of claim 15 wherein the partially to completely hydrophobic siliceous material is hydrophobic silica aerogel containing from about 3% to about 20% by weight of an organosilicon compound having the following formula:

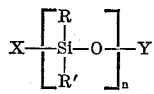

wherein R and R' are radicals selected from the group consisting of alkyl, aryl, alkaryl, and aralkyl radicals and combinations thereof and X and Y are selected from the group consisting of alkyl and alkoxy radicals, halides and combinations thereof and wherein "$n$" is at least 10, said hydrophobic siliceous material being characterized in having a specific surface area of from 100–500 square meters per gram and an aggregate particle size of below 15 microns.

18. A composition of matter comprising (1) not less than 65% by weight of a partially to completely hydrophobic particulate siliceous material, (2) between about 5% to 10% by weight of particles of an anhydrous, hydratable, non-deliquescent inorganic salt, and (3) between about 20% and 30% by weight of particles of hydrophilic siliceous material, wherein the total amount of inorganic salt and hydrophilic siliceous material present does not exceed 35% by weight of said composition; said composition being further characterized in having an electrical conductivity of not more than $10^{-7}$ gram per centimeter at a bulk density of 0.2 gram per cubic centimeter and in having a specific surface area of from 40 to 500 square meters per gram and an aggregate particle size of below 15 microns.

References Cited in the file of this patent

UNITED STATES PATENTS

| 2,547,822 | Johnson | Apr. 3, 1951 |
| 2,589,705 | Kistler | Mar. 18, 1952 |
| 2,681,878 | Kauppi | June 22, 1954 |
| 2,728,732 | Arnett et al. | Dec. 27, 1955 |
| 2,733,160 | Iler | Jan. 31, 1956 |
| 2,923,095 | Magimel-Pelonnier et al. | Feb. 2, 1960 |

OTHER REFERENCES

Frear: Chemistry of Insecticides, Fungicides and Herbicides, 2nd ed., 1948, p. 51.

Bartlett: Jour. Eco. Ent. 44, pp. 891–896 (1951).

Washington Post and Times Herald, Oct. 21, 1958, page B–7.

Scientific American, vol. 203, No. 1, July 1960, page 2.